C. A. DRUMMOND.
FLUID CLUTCH.
APPLICATION FILED MAY 28, 1917.
1,271,502.
Patented July 2, 1918.
2 SHEETS—SHEET 1.
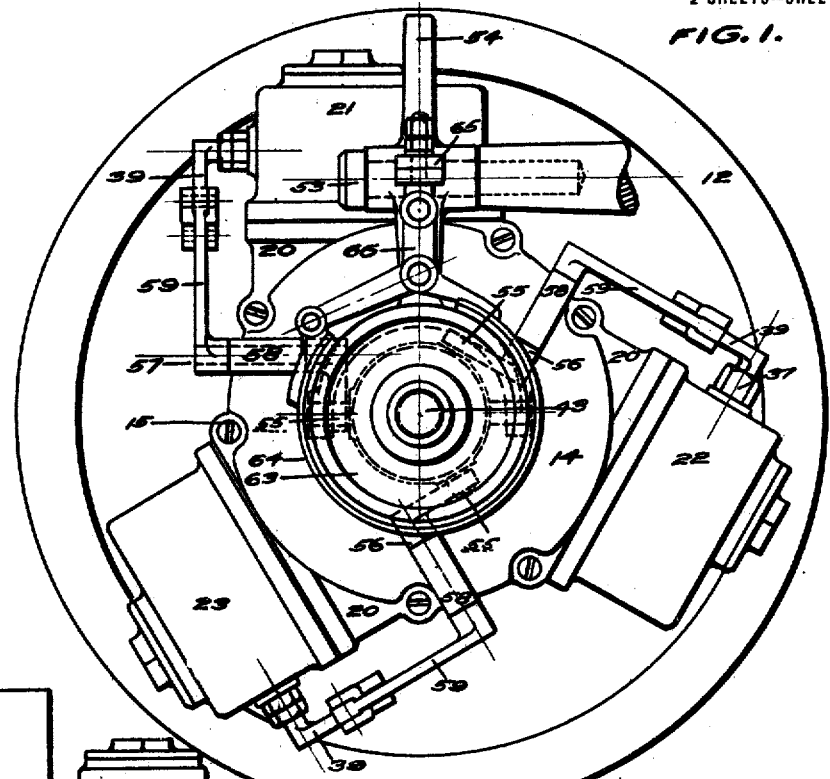
INVENTOR
CARLTON A. DRUMMOND
by Hazard & Miller
attys

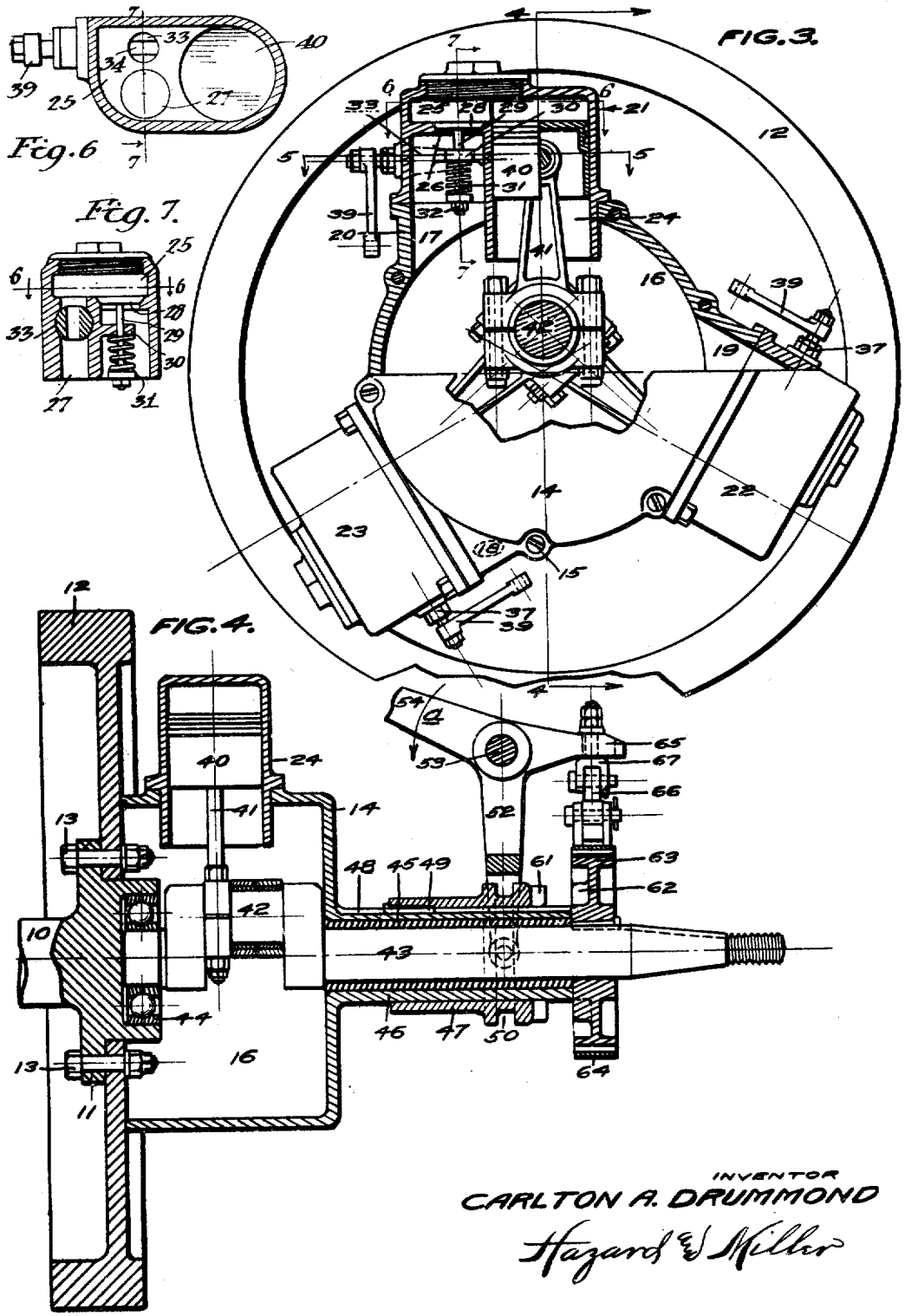

UNITED STATES PATENT OFFICE.

CARLTON A. DRUMMOND, OF LOS ANGELES, CALIFORNIA.

FLUID-CLUTCH.

1,271,502.  Specification of Letters Patent.  Patented July 2, 1918.

Application filed May 28, 1917. Serial No. 171,543.

*To all whom it may concern:*

Be it known that I, CARLTON A. DRUMMOND, a citizen of the United States, residing at Los Angeles, in the county of Los Angeles and State of California, have invented new and useful Improvements in Fluid-Clutches, of which the following is a specification.

My object is to make an improved fluid clutch transmission mechanism for automobiles and the like, and my invention consists in the novel features herein shown, described and claimed.

The invention is illustrated, by way of example, in the accompanying drawings in which:

Figure 1 is a view in end elevation illustrating the fluid clutch and particularly showing the valve control mechanism therefor.

Fig. 2 is a fragmentary view in side elevation illustrating the device disclosed in Fig. 1 and more clearly setting forth the operating means by which the valves are controlled, the positive clutch operated, and the band brake actuated.

Fig. 3 is a view in end elevation with parts broken away to disclose the fluid reservoir and the compression plungers.

Fig. 4 is a longitudinal section as seen on the line 4—4 of Fig. 3 illustrating the detail construction of the device.

Fig. 5 is a view in transverse section through the regulating valve and compression chamber, as seen on the line 5—5 of Fig. 3.

Fig. 6 is a sectional detail on the lines 6—6 of Figs. 3 and 7.

Fig. 7 is a sectional detail on the lines 7—7 of Figs. 3 and 6.

Referring more particularly to the drawings, 10 indicates a driving shaft which, in the present instance, is the crank shaft of an internal combustion engine. This shaft is formed with a bolting flange 11 upon which is mounted an engine flywheel 12 and secured by bolts 13. Fastened to the outer face of the flywheel is a fluid clutch case 14 which is held in position by means of cap screws 15. The transmission case 14 forms a cylindrical reservoir 16 which is concentric in relation to the axis of the shaft. This case is preferably formed with three openings 17, 18 and 19 which extend through the circumferential wall of the case and are disposed at equal angles to each other.

These openings are surrounded by walls 20 forming a square face against which combined valve housings and compression chambers 21, 22 and 23 are bolted. These chambers consist of compression cylinders 24 which extend radially in relation to the center of the case 14 and are formed with fluid passage-ways 25 at their upper ends. These passage-ways communicate with puppet valve openings 26 and rotary valve openings 27. Each puppet valve opening is tapered and provides a seat for a puppet valve 28 which is free to rise into the passage-way 25. The stems 29 of these valves 28 extend parallel to the axes of the compression cylinders and through bearings 30 where they are fitted with valve springs 31 and nuts 32. In this manner the valves will be normally seated and held in their seated positions by springs. Each opening 27 communicates with the rotating valve 33 which is provided with a port 34 adapted to control the passage of a fluid from the compression cylinder to the reservoir 16. The rotating valves, as particularly shown in Fig. 5, are frusto-conical and are provided with packing springs 36 which are positioned within packing nuts 37. The stem 38 of each valve is fitted with an actuating arm 39, the use of which will be hereinafter described.

Reciprocably mounted within the compression cylinders 24 are pistons 40 which are provided with connecting rods 41. These rods are rotatably fastened around the throw or crank pin 42 of a driven crank shaft 43. The body of the driven shaft 43 is in longitudinal alinement with the main shaft 10, one end of it being supported by the ball-bearing 44 in the end of the driving shaft and the other end within an anti-friction bearing 45 positioned within the hub 46 of the case. It will be understood that the cylinders 24 are spaced in relation to each other around the case 14 so that the piston rods may stand alongside each other as they connect with the crank shaft, as particularly shown in Fig. 4 of the drawings. The outer end of the driven crank shaft 43 is adapted to be connected with any suitable mechanism to be driven and is in axial alinement with the main crank shaft 10. This mechanism will, of course, impose a load upon the driven crank shaft 43 and will cause the pistons to be reciprocated within the compression cylinders 24 when the shaft 10 rotates. When the fluid reservoir 16 is filled with an oil, or other liquid, the differences in the speed of rotation between the driving shaft 10 and the driven shaft 43 will be determined by the volume of oil which is drawn into the compression chambers by the suction of the pistons and ejected therefrom through the rotary valves by the compression of the pistons.

In order that the volume of fluid transferred through the compression cylinders may be easily varied and the speed of rotation of the driven crank shaft 43 thus controlled, a sleeve 47 is positioned upon the hub 46 of the case. The hub 46 is formed with a longitudinally extending key-way 48 along which a key 49 may slide. This key is fastened within the bore of the sleeve 47 and insures that the sleeve will rotate with the case. An annular groove 50 is formed around the sleeve and adjacent its outer end. This groove is engaged by yoke pins 51 which are mounted in the end forks of a yoke member 52. This member is pivotally secured upon a pin 53 and may be swung, as desired, by a speed control lever 54. Pins 55 extend outwardly from the sides of the sleeve and in equal angular relation to each other. These pins are engaged by the bifurcated ends of rocker arms 56, as particularly shown in Fig. 2. The arms 56 are fastened to shafts 57 rotatably held within bearings 58 which are formed integral with the end wall of the case 14. The outer ends of each of the shafts 57 are supplied with levers 59 which are connected with the actuating arms 39 by connecting rods 60. It will thus be seen that as the sleeve 47 is moved back and forth along the hub 46, the valve members 33 will be rotated to increase or reduce the opening therethrough.

In order that the device may be caused to drive positively, a clutch jaw 61 is formed around the end face of the sleeve 47 and adapted to be brought into mesh with the complementary jaw 62 formed upon a brake spider 63 which is keyed to the driven crank shaft 43. This will insure that when the operating levers and the sleeve 47 have swung the valve 33 to its extreme closed position, the valve case and the driven crank shaft 43 may be locked together to drive the shafts 10 and 43 at the same rate of speed.

The brake drum 63 is provided to be encircled by a brake band 64. The brake is controlled by a brake arm 65 which is formed integral with the yoke member 52 and the speed control lever 54, all of which will operate simultaneously in a manner which will be easily understood. A connecting link 66 connects the brake band mechanism with an adjusting shackle 67 secured through the end of the brake lever 65 and adjustably connected to the brake band and lever. The brake mechanism is set to retard or hold the driven shaft 43 when the valves 33 are wide open so as to stop the driven mechanism without stopping the engine.

In operation, the device is assembled, as particularly shown in the drawings, and the case 14 is fixed to the flywheel 12. As the crank shaft 10 rotates at any given or variable speed, the case 14 will also be rotated. The reservoir of this case is substantially filled with a fluid, such as a light lubricating oil. As the case revolves, it will cause the pistons 40 to reciprocate within the compression cylinders 24. This is due to the fact that the load upon the driven crank shaft 43 will cause it to be reluctant to turn and will produce a variation in movement between the driven crank shaft and the case. As the pistons are drawn inwardly they will automatically raise the puppet valves 26 and draw the fluid from the reservoir into the cylinders. When the outward movement of the pistons takes place, the valves 26 will automatically close and the fluid will be forced outwardly through the port opening 27 and the rotary valve 33, from which place it will return to the reservoir. The resistance of the fluid against the pistons will cause the driven crank shaft 43 to rotate. The speed ratio between the shaft 10 and the shaft 43 may be directly controlled by the movement of the speed control lever 54. When this lever is swung in the direction indicated by the arrow —a— in Fig. 4, the sleeve 47 will be moved outwardly along the hub 46 of the case. This movement will effect the valve actuating levers 39 through the intermediate levers and links 56, 59 and 60 and close the valve 33 more or less and when the valves 33 are closed the brake will be released. As the actuating lever 39 swings in the direction of the arrow —b— the valves 33 will be opened more or less, and when the valves are wide open the brake will be set to hold the driven mechanism without stopping the engine. Closing the valves more or less will increase the fluid compression within the cylinders 24 and directly increase the speed of rotation of the driven crank shaft 43. When the valves 33 have been entirely closed the driven crank shaft 43 will rotate at practically the same speed as the driving crank shaft 10. Further movement of the control lever 54 will throw the clutch jaws 61 into mesh with the jaws 62 and the engagement with each other will lock the driving shaft 10 and the driven shaft 43 to rotate as a single shaft and at a single speed. A reverse operation will disengage the clutch members and thereafter open the rotary valves 33 gradually to decrease the speed of rotation of the driven crank shaft 43 in relation to the driving shaft 10.

It will thus be seen that the transmission mechanism here disclosed affords simple means for positively varying the speed ratio between a driving and a driven shaft and to permit the shafts to be controlled in relation to each other to gradually change their speed ratios without violent shock, or excessive wear upon the parts involved.

While I have shown the preferred construction of my fluid transmission gear as now known to me, it will be understood that various changes in the combination, construction and arrangement of parts may be made by those skilled in the art without departing from the spirit of my invention.

I claim:

1. The combination with a driving crank shaft, of a fly wheel fixed upon one end of the crank shaft and having a solid web, a fluid clutch case fixed against the web and forming a fluid chamber, means forming a bearing in the end of the driving shaft, means forming a bearing through the case in line with the driving shaft, a driven crank shaft mounted with the crank in the case and operating in said bearings, piston cylinders extending radially from the case, pistons in the piston cylinders and connected to the crank shaft, means forming compression chambers at the outer ends of the piston cylinders, inlet valves for the compression chambers, rotary outlet valves for the compression chambers, a clutch member fixed upon the driven shaft, a second clutch member slidingly splined upon the second bearing and adapted to engage the first clutch member, a control lever pivotally mounted, a yoke member extending from the control lever and engaging the sliding clutch member, and connections between the rotary outlet valves and the sliding clutch member, so that when the rotary valves are closed the clutch members are engaged.

2. The combination with a driving crank shaft, of a fluid clutch case fixed to one end of the shaft, a driven crank shaft mounted with its crank in the clutch case, piston cylinders extending radially from the clutch case, pistons in the piston cylinders and connected to the driven crank shaft, means forming compression chambers at the outer ends of the piston cylinders, means for regulating the compression in the compression chambers, a clutch member fixed upon the driven crank shaft, a second clutch member slidingly splined relative to the clutch case and adapted to engage the first clutch member, and connections between the means for controlling the compression and the sliding clutch member, so that when the compression chamber is closed the clutch members are engaged.

In testimony whereof I have signed my name to this specification.

CARLTON A. DRUMMOND.